(12) United States Patent
Iwayama

(10) Patent No.: US 7,973,984 B2
(45) Date of Patent: Jul. 5, 2011

(54) IMAGE READING APPARATUS

(75) Inventor: Akira Iwayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 506 days.

(21) Appl. No.: 12/117,523

(22) Filed: May 8, 2008

(65) Prior Publication Data

US 2009/0067012 A1   Mar. 12, 2009

(30) Foreign Application Priority Data

Sep. 10, 2007   (JP) ................................. 2007-233824

(51) Int. Cl.
*H04N 1/04*   (2006.01)

(52) U.S. Cl. ........ 358/486; 358/488; 358/497; 358/474; 358/449; 358/464; 358/465

(58) Field of Classification Search .................. 358/486, 358/488, 497, 494, 474, 471, 449, 464, 465; 250/559.4, 234–236; 382/199, 165, 312, 382/318, 319; 399/211, 212
See application file for complete search history.

(56) References Cited

U.S. PATENT DOCUMENTS

| | | | |
|---|---|---|---|
| 5,760,412 A * | 6/1998 | Yang et al. | 250/559.4 |
| 6,987,880 B2 * | 1/2006 | Dolan et al. | 382/165 |
| 7,355,764 B2 * | 4/2008 | Ooshima et al. | 358/488 |
| 2007/0146818 A1 * | 6/2007 | Horiguchi | 358/474 |

FOREIGN PATENT DOCUMENTS

| | | |
|---|---|---|
| JP | 2001-223840 A | 8/2001 |
| JP | 2005-072947 A | 3/2005 |

* cited by examiner

*Primary Examiner* — Cheukfan Lee
(74) *Attorney, Agent, or Firm* — Lowe, Hauptman, Ham & Berner, LLP

(57) ABSTRACT

An image reading apparatus includes an image reading unit that can move along a scanning direction, and reads primary image data from a medium arranged on a medium arrangement surface by moving the image reading unit from a home position to a sub-scanning direction. The image reading apparatus further includes a determining unit that determines the presence or absence of the medium on the medium arrangement surface based on determination image data that is different from primary image data, and read by the image reading unit at a determination position arranged between the home position and a reading-end position of the primary image data.

13 Claims, 6 Drawing Sheets

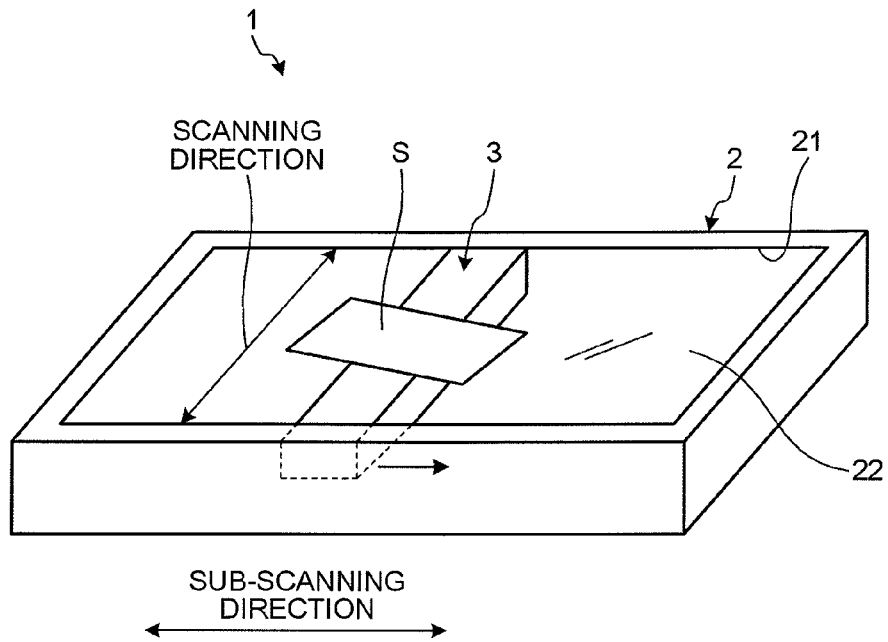
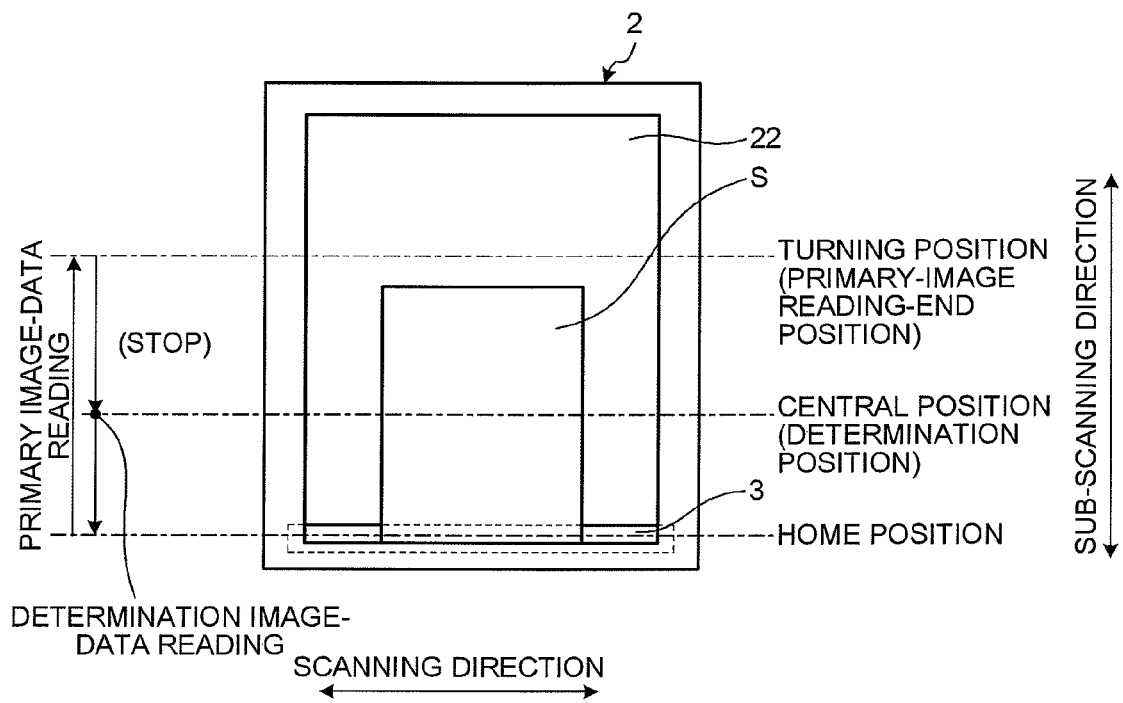

FIG.5
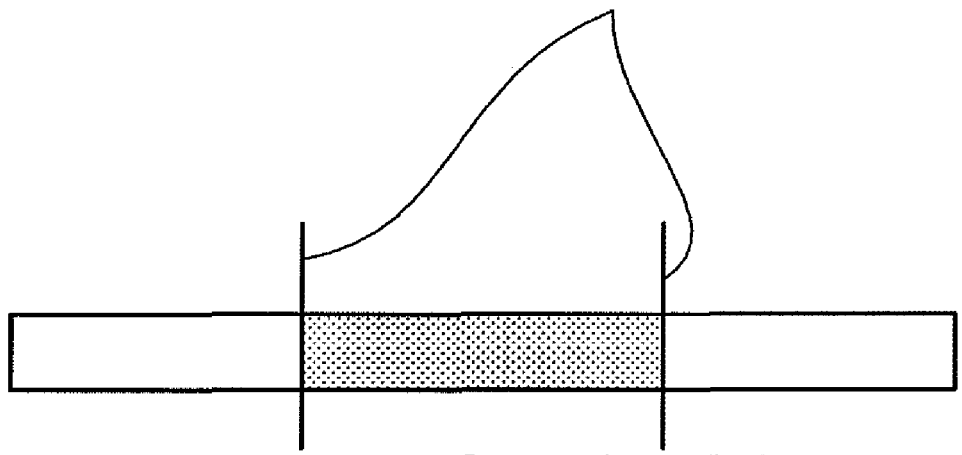
PRIMARY IMAGE AT CENTRAL
POSITION
(DETERMINATION POSITION)
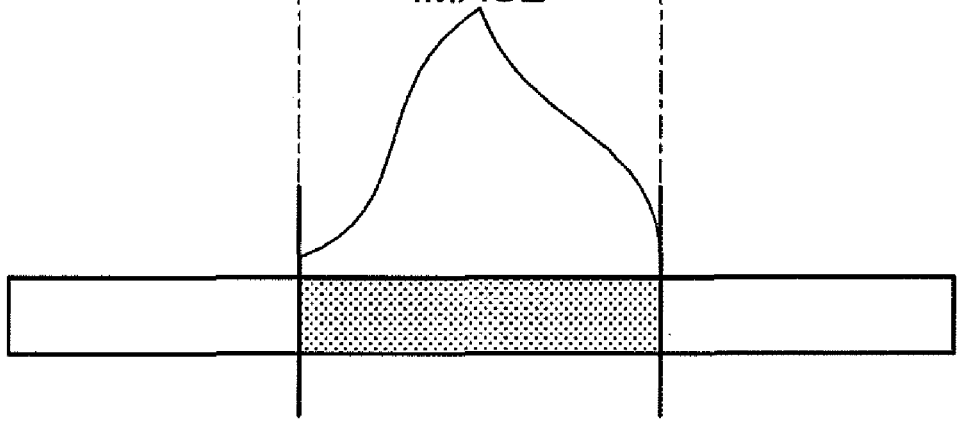
DETERMINATION IMAGE
(ORIGINAL IS PRESENT)

IMAGE READING APPARATUS

RELATED APPLICATIONS

The present application is based on, and claims priority from, Japan Application Number 2007-233824, filed Sep. 10, 2007, the disclosure of which is hereby incorporated by reference herein in its entirety.

BACKGROUND OF THE INVENTION

1. Field of the Invention

The present invention relates to an image reading apparatus, and particularly relates to a flatbed image reading apparatus.

2. Description of the Related Art

One of conventional image reading apparatuses applied to an image scanner, a photocopier, a facsimile, a character recognition device, and the like, is a flatbed (FB) image reading apparatus that reads image data of a medium, for example, a book or a magazine, by arranging the medium on a platen and moving a line image sensor over the medium. Because the medium is arranged on the platen for reading its image data, the flatbed image reading apparatus can read a relatively thick medium, such as a book or a magazine. When using such flatbed image reading apparatus, a medium is sometimes left behind on the platen in some cases after image data of the medium arranged on the platen is read, for example, due to carelessness of a user. To avoid leaving behind a medium, an image reading apparatus is provided with a hardware device such as an additional sensor at a point where the medium is to be arranged, and configured to determine that the medium is removed by detecting the presence or absence of the medium with the additional sensor after predefined processing is finished, and by detecting a movement of opening and closing of a lid or other parts that covers the medium while reading image data.

Alternatively, for example, an image reading apparatus disclosed in Japanese Patent Application Laid-Open No. 2005-72947 is an image reading apparatus configured to avoid leaving behind a medium on the platen as well as to suppress increase in the number of parts, such as addition of the sensor, which may otherwise result in an increase in production cost. The image reading apparatus includes an original holder (or a lid) that covers and uncovers a transparent board (or a platen) on which an original is to be laid, and an inside surface of the original holder is configured as a fixing unit that is luminous by storing therein light and emitting light by itself. After reading operation of an original is finished and then a certain time passes over, as a solid-state imaging device receives light emitted from the fixing unit when an open-close detecting unit detects a closed state of the original holder, the image reading apparatus detects the presence or absence of a left-behind original based on the amount of light received by the solid-state imaging device while the original holder is still closed. A medium-remainder detecting device of an image scanner disclosed in Japanese Patent Application Laid-Open No. 2001-223840 is configured to detect the presence or absence of a remaining medium on a reading-medium arrangement surface by reading image in a state that nothing is laid on the reading-medium arrangement surface and storing therein compressed data of read image data, then re-reading the medium after finishing predefined processing and compressing the re-read image data, and comparing a file size of the compressed re-read image with a compressed file size of the image when nothing is laid.

However, the image reading apparatus disclosed in the patent document No. 2005-72947 needs to detect the presence or absence of a left-behind original in a closed state of the original holder that covers and uncovers the transparent board, therefore, the technology cannot be applied to an image reading apparatus that does not include the original holder. The medium-remainder detecting device of an image scanner disclosed in the patent document No. 2001-223840 needs to read image data of the whole of a medium as a reading subject only for detecting the presence or absence of a left-behind original, so that the amount of processing data may be increased.

SUMMARY OF THE INVENTION

It is an object of the present invention to at least partially solve the problems in the conventional technology.

According to an aspect of the present invention, an image reading apparatus includes an image reading unit, movable from a home position to a reading-end position in a sub-scanning direction along a medium arranged on a medium arrangement surface, for reading primary image data from the medium, and reading determination image data from the medium at a determination position set between the home position and the reading-end position, the determination image data being different from the primary image data, and a determining unit for determining the presence or absence of the medium on the medium arrangement surface based on the determination image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram of a perspective view of the FB scanner shown in FIG. 1;

FIG. 3 is a schematic diagram of a plan view of a transparent platen of the FB scanner shown in FIG. 1;

FIG. 5 is a schematic diagram for explaining determination of the presence or absence of an original based on a primary image and a determination image read by the FB scanner shown in FIG. 1;

DETAILED DESCRIPTION OF THE PREFERRED EMBODIMENTS

Exemplary embodiments of the present invention will be explained below in detail with reference to the accompanying drawings. The present invention is not limited to the embodiments. Components according to the following embodiments include components that can be replaced with others easily by a person skilled in the art, or the substantially same components as conventional ones.

Figure 1:
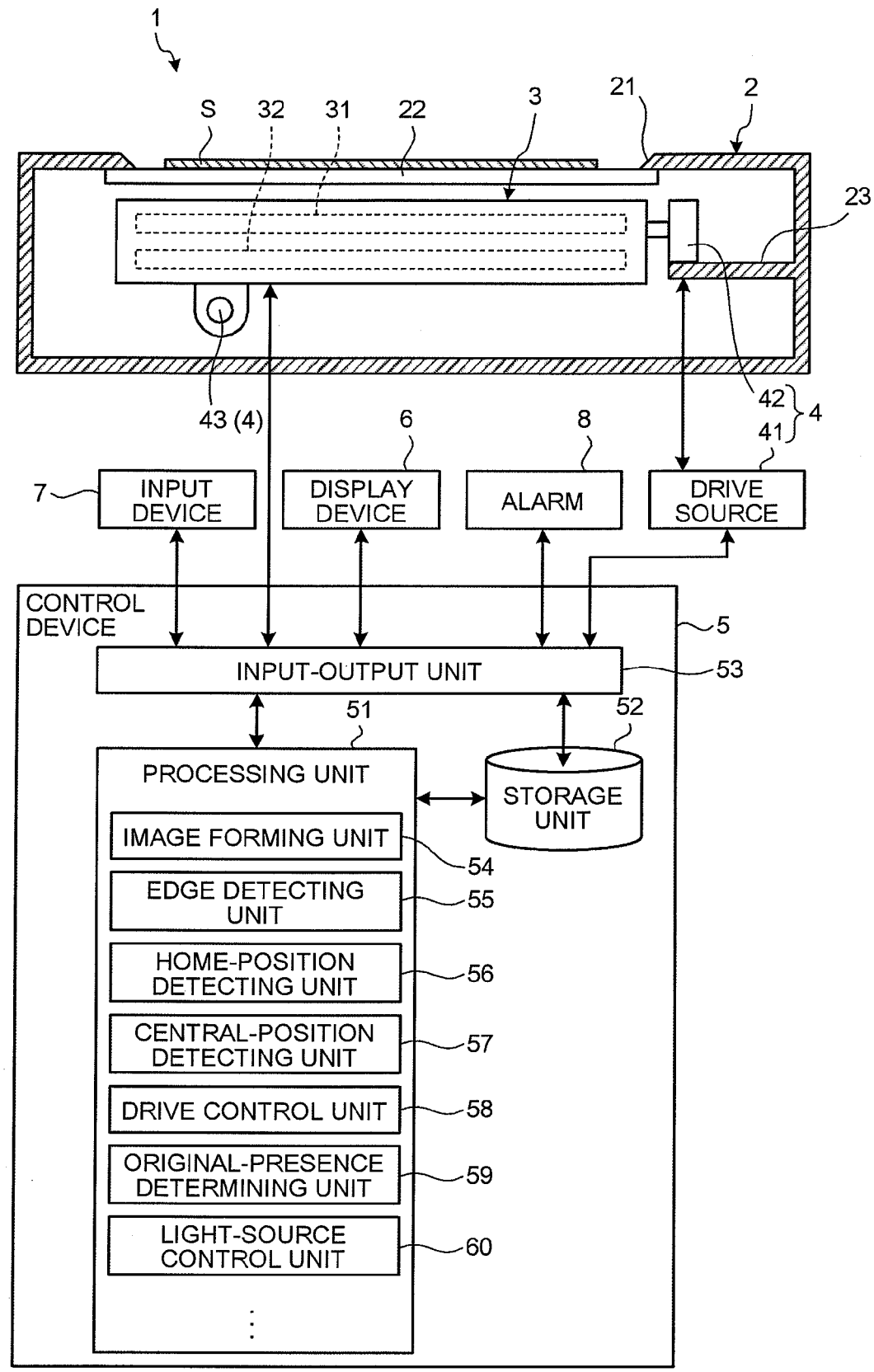
FIG. 1 is a schematic diagram of a configuration of a flatbed (FB) scanner according to an embodiment of the present invention.

A flatbed (FB) scanner 1 is an image reading apparatus according to an embodiment of the present invention. As shown in FIGS. 1 and 2, the FB scanner 1 is configured to read image data of an original S by arranging the original S as a medium of which image is to be read on a transparent platen 22 as a medium arrangement surface of a housing 2, and moving a line image sensor 32 of an optical reading unit 3 as an image reading unit with a unit-carrying unit 4 as a carrying unit along a sub-scanning direction over the original S. The FB scanner 1 can be applied to an image reading apparatus used in various devices, for example, an image scanner, a photocopier, a facsimile, or a character recognition device. Because the FB scanner 1 reads image data by arranging the original S on the transparent platen 22, the FB scanner 1 can read the original S that is relatively thick, for example, a book or a magazine.

Specifically, the FB scanner 1 includes the housing 2, the optical reading unit 3, the unit-carrying unit 4, and a control device 5.

The housing 2, inside which the optical reading unit 3 is provided, accommodates other units included in the FB scanner 1. The housing 2 is formed in a hollow box shape, and a center opening 21 is formed on its top surface. The housing 2 is provided with the transparent platen 22 as the medium arrangement surface in the center opening 21. The transparent platen 22 is made from a material that allow light pass through, and the original S of which image data is to be read by the FB scanner 1 is arranged on the transparent platen 22. Moreover, the housing 2 is provided with a rail 23 in its inside. The rail 23 extends along the sub-scanning direction of the optical reading unit 3.

The optical reading unit 3 is provided below the transparent platen 22, and can read image data by optically scanning an image on the original S arranged on the transparent platen 22 and converting into an electric signal. The optical reading unit 3 includes a light source 31 and the line image sensor 32, and can read image data of the original S by irradiating light from the light source 31 to the original S arranged on the transparent platen 22, and converting reflected light reflected by the original S and converged by an optical system (not shown), such as a lens, into an electric signal with the line image sensor 32.

Specifically, the light source 31 irradiates light to the original S via the center opening 21 and the transparent platen 22 provided on the housing 2. Various light-emitting devices, for example, such as a light emitting diode, can be used as the light source 31. The optical system (not shown), such as a lens, converges light that is reflected by the original S and passes through the transparent platen 22 and the center opening 21, onto a light receiving surface of the line image sensor 32. The line image sensor 32 reads image data by receiving reflected light that is irradiated by the light source 31, reflected by the original S, and passes through the optical system, such as a lens, and converting received light into an electric signal. As the line image sensor 32, for example, a charge-coupled device (CCD) line sensor can be used as a linear image sensor (one-dimensional image sensor) that a plurality of photoelectric conversion elements each of which generates an electrical charge by receiving light is arranged in line. The arrangement direction of the photoelectric conversion elements, i.e., the longitudinal direction of the line image sensor 32, is the scanning direction, and a direction orthogonal to the scanning direction is the sub-scanning direction, i.e., a direction in which the unit-carrying unit 4 moves the optical reading unit 3 over the original S.

The unit-carrying unit 4 can move the optical reading unit 3 in the sub-scanning direction, and includes a drive source 41, a roller 42, and a carrier shaft 43. The drive source 41 generates a driving force to move the optical reading unit 3, and an electric motor can be used as the drive source 41. The driving force generated by the drive source 41 acts on the optical reading unit 3 as a driving force to move the optical reading unit 3 in the sub-scanning direction via a transfer belt and a gear, which are not shown. The roller 42 is provided at an end of the optical reading unit 3 in the scanning direction, and is in contact with the rail 23 arranged inside the housing 2. The roller 42 assists movement of the optical reading unit 3 in the sub-scanning direction by rolling on the rail 23 and trailing along with the movement of the optical reading unit 3 in the sub-scanning direction. The carrier shaft 43 is provided on the other end of the optical reading unit 3 in the scanning direction, and on the bottom side of the optical reading unit 3. The carrier shaft 43 extends along the sub-scanning direction of the optical reading unit 3 similarly to the rail 23, and acts as a guide rail that guides the movement of the optical reading unit 3 in the sub-scanning direction.

The FB scanner 1 is configured such that the original S is arranged on the transparent platen 22. Light irradiated onto the original S from the light source 31 is reflected by the original S, and converged by an optical system (not shown), such as a lens. The reflected light via the optical system comes into the line image sensor 32 and is converted into an electric signal, so that single-line image data of the original S is read per reading-line along the scanning direction. The unit-carrying unit 4 then moves the optical reading unit 3 from a home position as an initial position to the sub-scanning direction, and the optical reading unit 3 reads image data sequentially along the sub-scanning direction, so that the optical reading unit 3 can read two-dimensional image data on the original S as primary image data.

When using the FB scanner 1 configured in this way, the original S is sometimes left behind on the transparent platen 22 in some cases after the original S is arranged on the transparent platen 22 and image data is read, for example, due to the carelessness of a user.

The FB scanner 1 determines the presence or absence of the original S on the transparent platen 22 with a simple configuration by performing determination based on determination image data that is different from primary image data, and read by the optical reading unit 3 at a determination position arranged between the home position and a reading-end position of the primary image data.

Specifically, the FB scanner 1 includes in the control device 5 an image forming unit 54, an edge detecting unit 55 as a medium-position detecting unit, a home-position detecting unit 56, a central-position detecting unit 57 as a determination-position setting unit, a drive control unit 58 as a drive control unit, an original-presence determining unit 59 as a determining unit, and a light-source control unit 60 as a light-source control unit.

The control device 5 is a computer, such as a personal computer, and includes a processing unit 51, a storage unit 52, and an input-output unit 53, as shown in FIG. 1. The processing unit 51 and the storage unit 52 are connected to each other. Furthermore, the control device 5 is configured such that the optical reading unit 3 and the drive source 41 are connected to the processing unit 51 via the input-output unit 53. Moreover, the control device 5 is configured such that a display device 6, an input device 7, and an alarm 8 are connected to the processing unit 51 via the input-output unit 53.

The display device 6 is a cathode ray tube (CRT), a liquid crystal display, or the like, with which display contents can be visually recognized, and can display, for example, an image based on image data read by the optical reading unit 3. The input device 7 can receive input of various operations and information from a user. The alarm 8 is configured to give a warning by sounding a beep or another audible alert. The display device 6 and the alarm 8 are notifying units that notify a user of information, such as a situation that the original S is left behind, based on a result of determination of the presence or absence of the original S on the transparent platen 22 obtained by the original-presence determining unit 59.

Figure 8:
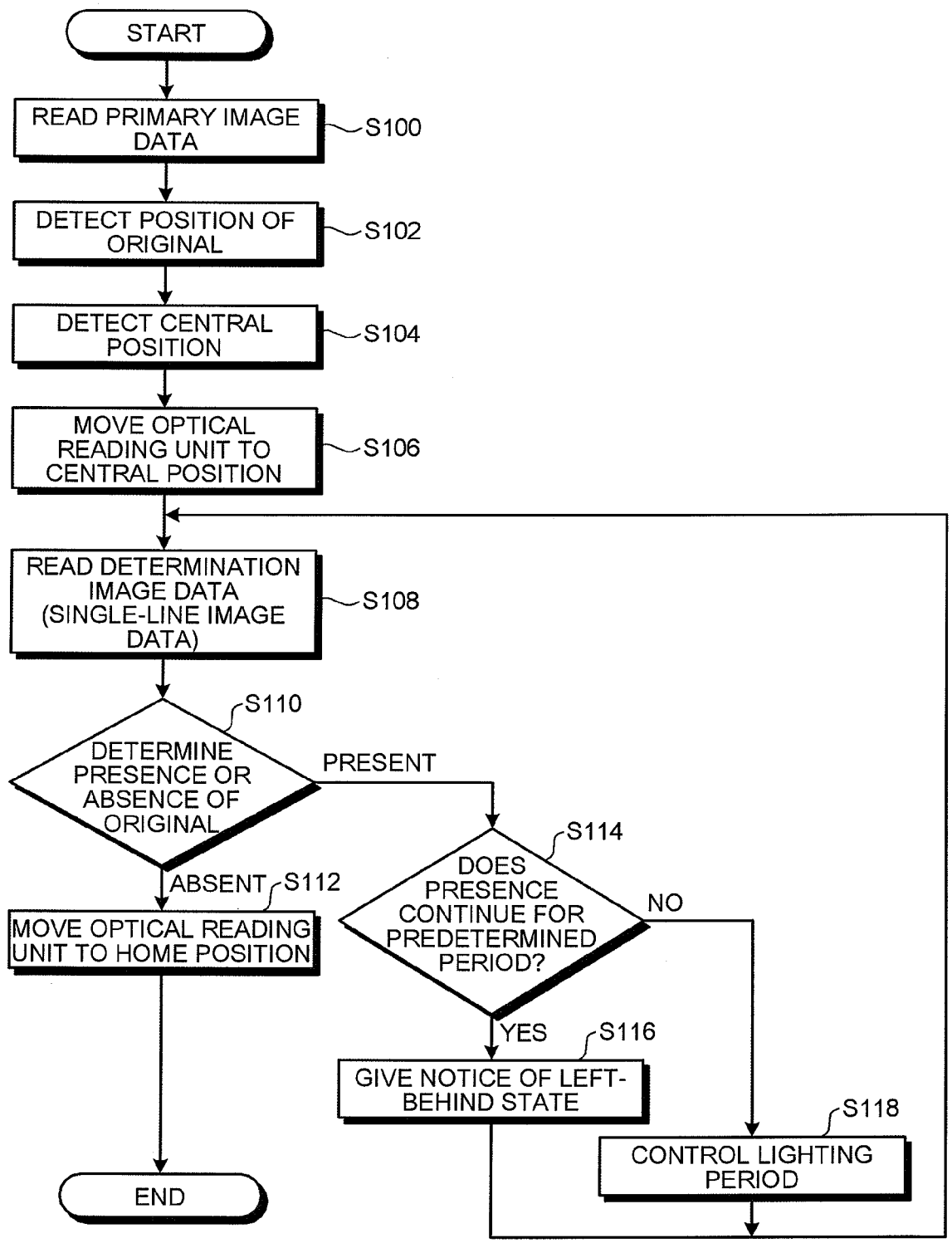
FIG. 8 is a flowchart for explaining original-presence determination control performed by the FB scanner shown in FIG. 1.

The storage unit 52 stores therein a computer software program that implements original-presence determination control, which will be described later with reference to FIG. 8. The storage unit 52 can be configured from a hard disk drive, a magneto-optical disk drive, a non-volatile memory, such as a flash memory or a compact disk read only memory (CD-ROM), which is a recording medium only available to be read, or a volatile memory, such as a random access memory (RAM), or a combination of some of them.

The computer software program can be a program configured to implement the original-presence determination control in combination with another computer software program already stored in a computer system. Alternatively, the original-presence determination control can be implemented by storing the computer software program for implementing functions of the processing unit 51 onto a computer-readable recording medium, and causing the computer system to read and to execute the computer software program recorded on the recording medium. It is assumed that the computer system includes an operating system (OS) and hardware such as a peripheral device. The storage unit 52 can be built into the processing unit 51 or provided in a separate device, for example, a database server.

The processing unit 51 includes a memory (not shown) and a central processing unit (CPU) (not shown). When executing the original-presence determination control, the processing unit 51 controls based on a predetermined process procedure of the original-presence determination control by reading the computer software program into the memory incorporated in the processing unit 51. When controlling, the processing unit 51 stores values halfway through a computation into the storage unit 52, and executes the control by taking out the stored values. The processing unit 51 can be implemented by dedicated hardware instead of the computer software program.

The control device 5 includes in the processing unit 51 the image forming unit 54, the edge detecting unit 55, the home-position detecting unit 56, the central-position detecting unit 57, the drive control unit 58, the original-presence determining unit 59, and the light-source control unit 60.

Based on image data read from the original S by the optical reading unit 3, the image forming unit 54 forms an image of the representation of the image data. The image formed by the image forming unit 54 based on the image data can be displayed, for example, on the display device 6. The home-position detecting unit 56 detects the home position as an initial position of the optical reading unit 3. The drive control unit 58 controls driving of the unit-carrying unit 4.

Specifically, as shown in FIG. 3, the drive control unit 58 moves the optical reading unit 3 from the home position detected by the home-position detecting unit 56 to the sub-scanning direction by controlling driving of the unit-carrying unit 4, and the optical reading unit 3 reads primary image data from the original S. After the optical reading unit 3 finishes reading the primary image data, the drive control unit 58 then moves the optical reading unit 3 from a turning position as a primary-image reading-end position toward the home position by controlling driving of the unit-carrying unit 4, and stops the optical reading unit 3 at a determination position set between the turning position (reading-end position) and the home position. The optical reading unit 3 reads determination image data along the scanning direction from the original S when stopping at the determination position. After it is determined that the original S is absent on the transparent platen 22 in accordance with determination of the presence or absence of the original S on the transparent platen 22 performed by the original-presence determining unit 59 based on the determination image data, the drive control unit 58 then moves the optical reading unit 3 from the determination position to the home position by controlling driving of the unit-carrying unit 4, and stops the optical reading unit 3 at the home position.

The primary image data is image data read by the optical reading unit 3, and two-dimensional image data created by reading single-line image data per reading-line in the scanning direction sequentially along the sub-scanning direction, as described above. On the other hand, the determination image data is image data read by the optical reading unit 3, and single-line image data in the scanning direction at the determination position, in other words, one-dimensional image data. Therefore, the amount of the determination image data is much less than the amount of the primary image data. In addition, because the determination image data is read at a determination position by the optical reading unit 3 that also reads the primary image data, the determination image data to be used for determining the presence or absence of the original S on the transparent platen 22 can be acquired without any separately provided component, such as an additional sensor.

Returning to FIG. 1, the edge detecting unit 55 detects the position of the original S on the transparent platen 22 based on primary image data. More specifically, the edge detecting unit 55 detects the position of the original S by detecting edges extending along the sub-scanning direction of the original S on the transparent platen 22 based on the primary image data by performing one or some of various edge-detection processing, for example, cropping, which is processing of cutting out an area surrounded by four vertexes as the area of the original.

The central-position detecting unit 57 detects a central position of the original S on the transparent platen 22 in the sub-scanning direction based on the edges of the original S on the transparent platen 22 detected by the edge detecting unit 55 from primary image data, and sets a determination position at the central position. In other words, the central-position detecting unit 57 sets a determination position at the central position as a position within an area where the original S is arranged based on the position of the original S detected by the edge detecting unit 55. This means that the central-position detecting unit 57 sets a determination position based on primary image data.

Figure 4:
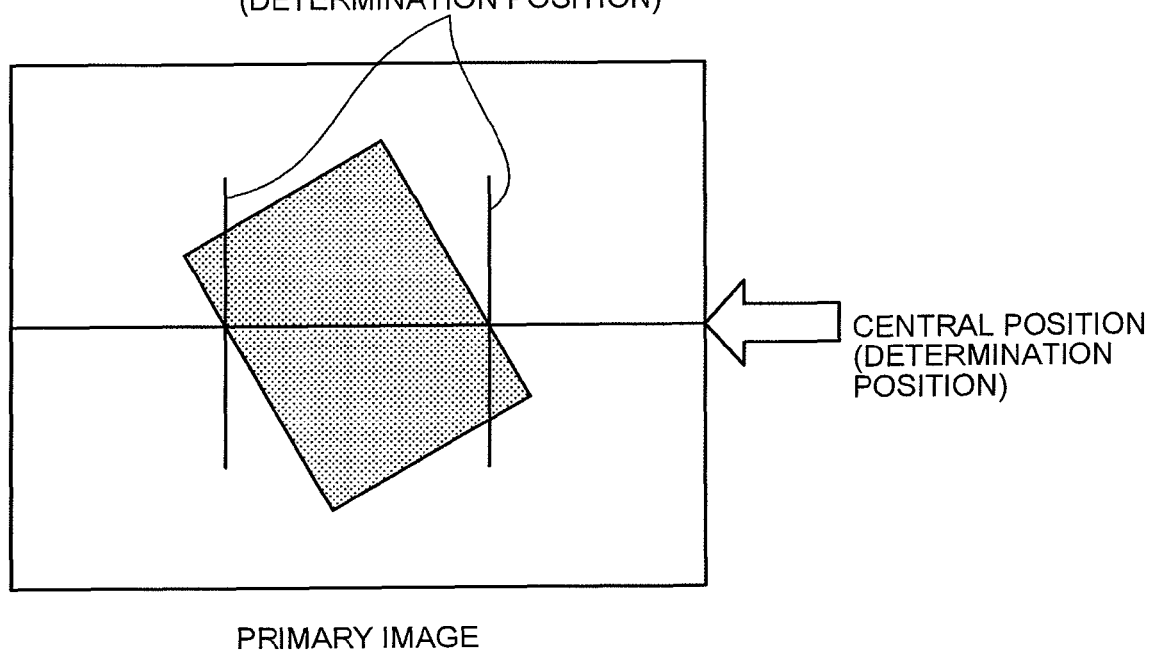
FIG. 4 is a schematic diagram of an example of a primary image read by the FB scanner shown in FIG. 1.

The original-presence determining unit 59 determines the presence or absence of the original S on the transparent platen 22 based on determination image data read by the optical reading unit 3 from the original S at a determination position determined in this way, and primary image data at a determination position as shown in FIG. 4. Specifically, the original-presence determining unit 59 compares a position of the original S on the transparent platen 22 based on the primary image data at the determination position with a position of the original S on the transparent platen 22 based on the determination image data. The original-presence determining unit 59 detects, for example, edges of the original S on the transparent platen 22 based on the determination image data, and then compares them with the edges of the original S on the transparent platen 22 based on the primary image data at the determination position. If a deviation of the position of the original S on the transparent platen 22 based on the primary image data from the position of the original S on the transparent platen 22 based on the determination image data is within a predetermined range, the original-presence determining unit 59 determines that the original S is present on the transparent platen 22, by contrast, if the deviation in the positions of the original S exceeds the predetermined range, the original-presence determining unit 59 determines that the original S is absent on the transparent platen 22.

More specifically, as shown in FIG. 5, if the position of the original S based on the determination image data that the optical reading unit 3 reads at the determination position after reading the primary image data is the substantially same position as the position of the original S based on the primary image data that is read first, it can be determined that the original S is still laid on the transparent platen 22 after the primary image data is read. In other words, when the original S is present on the transparent platen 22, the primary image at the determination position of the representation of the primary image data at the determination position is substantially equal to the determination image of the representation of the determination image data. Thus, the original-presence determining unit 59 can determine that the original S is present on the transparent platen 22, when a deviation of the position of the original S on the transparent platen 22 based on the primary image data from the position of the original S on the transparent platen 22 based on the determination image data is within a predetermined range.

Figure 6:
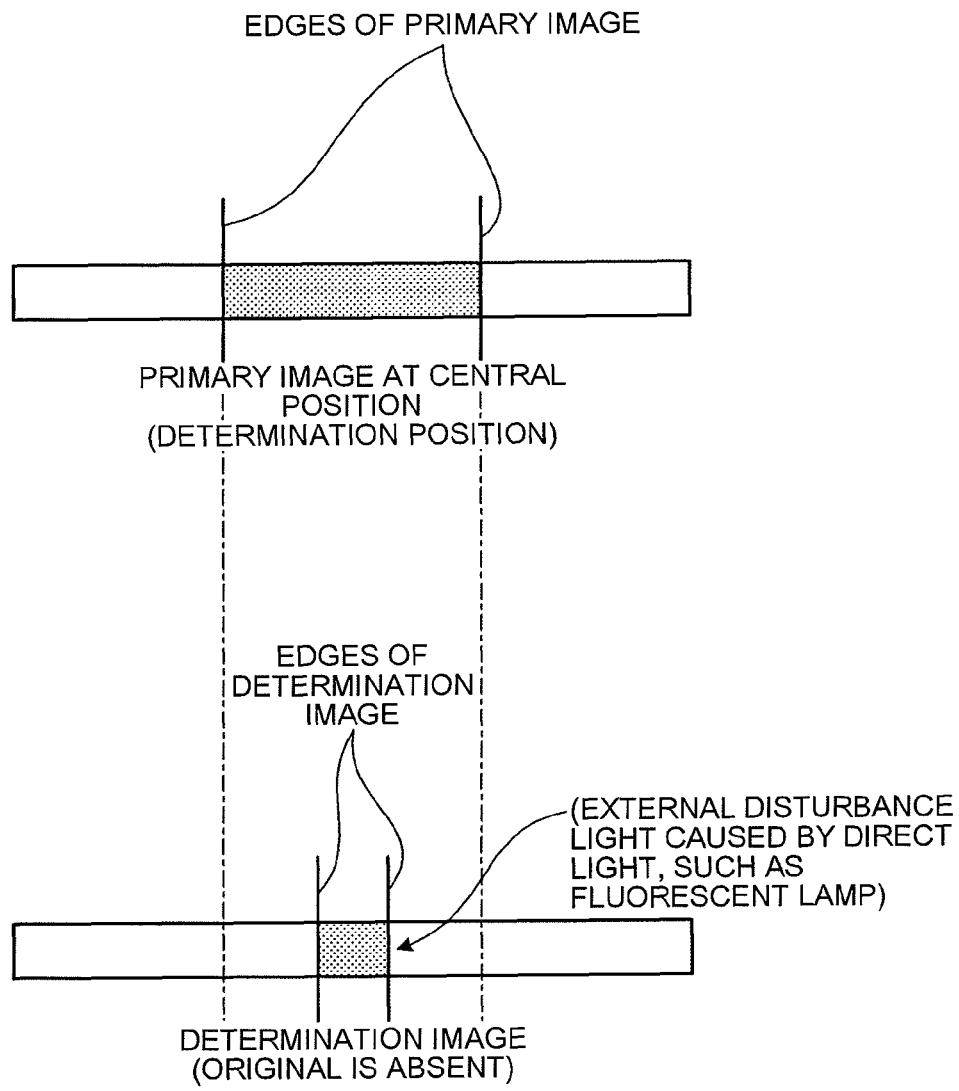
FIG. 6 is a schematic diagram of an example of a determination image (without original) read by the FB scanner shown in FIG. 1.

By contrast, when the original S is absent on the transparent platen 22, for example, when the original S is removed from the transparent platen 22 after the primary image is read by the optical reading unit 3 so that the original S is absent on the transparent platen 22, an image based on the determination image data is, as shown in FIG. 6, affected by external disturbance light caused by direct light, such as a fluorescent lamp, consequently, for example, edges of the image affected by such external disturbance light largely differ from the edges of the original S on the transparent platen 22 based on the primary image data. In other words, when the original S is absent on the transparent platen 22, the primary image corresponding to the primary image data at the determination position is largely different from the determination image corresponding to the determination image data. Thus, the original-presence determining unit 59 can determine that the original S is absent on the transparent platen 22, when a deviation of the position of the original S on the transparent platen 22 based on the primary image data from the position of the original S on the transparent platen 22 based on the determination image data exceeds the predetermined range.

The predetermined range, which is to be set in advance, of deviations of a position of the original S on the transparent platen 22 based on the primary image data at a determination position from a position of the original S on the transparent platen 22 based on the determination image data, can be appropriately set by taking into account a reading tolerance of the optical reading unit 3. A comparison between primary image data at a determination position and determination image data at a determination position can be performed by matching between a primary image based on the primary image data at the determination position and a determination image based on the determination image data. In other words, the original-presence determining unit 59 can determine that the original S is present on the transparent platen 22, in response to a match between the determination image corresponding to the determination image data at the determination position and the primary image corresponding to the primary image data at the determination position, by contrast, determine that the original S is absent on the transparent platen 22, in response to a mismatch between them.

The original-presence determining unit 59 then detects a left-behind state of the original S on the transparent platen 22 when a period during which it is determined that the original S is present on the transparent platen 22 continues for a predetermined period. The display device 6 (see FIG. 1) and the alarm 8 (see FIG. 1) notify a user of information, for example, a situation that the original S is left behind, based on a result of determination of the presence or absence of the original S on the transparent platen 22 obtained by the original-presence determining unit 59, and suggest removal of the original S to the user. For example, when the original-presence determining unit 59 determines that the original S is present on the transparent platen 22, the display device 6 displays an image of indicating that the original S is present on the transparent platen 22, and additionally when the original-presence determining unit 59 detects the left-behind state of the original S on the transparent platen 22, the alarm 8 gives a notice that the original S is left behind by sounding a beep. The original S on the transparent platen 22 is then removed, and after the original-presence determining unit 59 determines that the original S is absent on the transparent platen 22, the drive control unit 58 moves the optical reading unit 3 from the determination position to the home position by controlling driving of the unit-carrying unit 4, and stops the optical reading unit 3 at the home position. The predetermined period for a period during which it is determined that the original S is present on the transparent platen 22 can be appropriately set by taking into account detection precision, detection tolerance, and the like.

Figure 7:
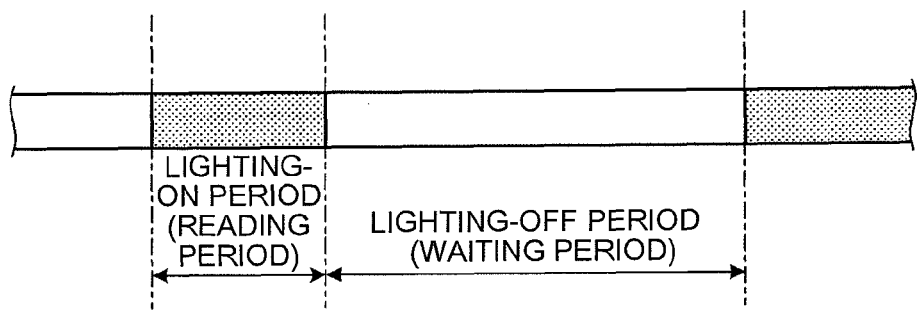
FIG. 7 is a schematic diagram for explaining intervals of reading determination image data with the FB scanner shown in FIG. 1.

The light-source control unit 60 controls activation of the light source 31 included in the optical reading unit 3. Until the original-presence determining unit 59 determines that the original S is absent on the transparent platen 22, reading of determination image data at the determination position by the optical reading unit 3, and determination of the presence or absence of the original S on the transparent platen 22 by the original-presence determining unit 59 are performed successively. During a period of determination of the presence or absence of the original S performed by the original-presence determining unit 59, as shown in FIG. 7, the light-source control unit 60 turns on and off the light source 31 (see FIG. 1). In other words, during the period of determination, the optical reading unit 3 does not continuously read determination image data, but reads determination image data at predetermined reading intervals, so that the amount of light from the light source 31 during the period of determination can be reduced. By setting predetermined reading intervals to be taken by the optical reading unit 3, i.e., a lighting cycle of the light source 31, to, for example, approximately 10 milliseconds, an erroneous detection of the left-behind state of the original S despite the removal of the original S can be avoided, so that it can be determined that the original S is quickly removed from the transparent platen 22 in response to a removing action by the user. By setting a lighting-on period (reading period) of the light source 31 shorter than its lighting-off period (waiting period), the amount of light during the period of determination can be more markedly reduced.

The original-presence determination control performed by the FB scanner 1 is explained below with reference to FIG. 8. The original-presence determination control is executed mainly by the control device 5.

First of all, the drive control unit 58 moves the optical reading unit 3 from the home position detected by the home-position detecting unit 56 to a reading-end position in the sub-scanning direction by controlling driving of the unit-carrying unit 4, the optical reading unit 3 reads primary image data from the original S, and the image forming unit 54 forms a primary image corresponding to the primary image data (Step S100). The edge detecting unit 55 then detects edges extending along the sub-scanning direction of the original S on the transparent platen 22 based on the primary image data, and detects the position of the original S (Step S102). The central-position detecting unit 57 then detects a central position of the original S on the transparent platen 22 in the sub-scanning direction based on the edges detected by the edge detecting unit 55, and sets a determination position at the central position (Step S104).

The drive control unit 58 then moves the optical reading unit 3 from a turning position (primary-image reading-end position) to the central position as the determination position set by the central-position detecting unit 57 by controlling driving of the unit-carrying unit 4, and stops the optical reading unit 3 at the central position (Step S106). The optical reading unit 3 then reads determination image data of single-line image data at the central position as the determination position, and the image forming unit 54 forms a determination image corresponding to the determination image data (Step S108). The original-presence determining unit 59 then determines the presence or absence of the original S on the transparent platen 22 based on the primary image data at the determination position and the determination image data at the determination position (Step S110). If it is determined that the original S is absent on the transparent platen 22 (Absent at Step S110), the drive control unit 58 moves the optical reading unit 3 from the determination position to the home position by controlling driving of the unit-carrying unit 3, stops the optical reading unit 3 at the home position (Step S112), and then terminates the control.

If it is determined that the original S is present on the transparent platen 22 (Present at Step S110), the original-presence determining unit 59 determines whether a period during which it is determined that the original S is present on the transparent platen 22 continues for a predetermined period (Step S114). If it is determined that the period continues for the predetermined period (Yes at Step S114), the original-presence determining unit 59 detects the left-behind state of the original S on the transparent platen 22, and the display device 6 and the alarm 8 notify the user that the original S is left behind on the transparent platen 22 (Step S116). The process control then goes back to Step S108, and repeats the subsequent processes until the original-presence determining unit 59 determines that the original S is absent on the transparent platen 22. By contrast, if it is determined that the period does not continue for the predetermined period (No at Step S114), the light-source control unit 60 turns on and off the light source 31 (see FIG. 1) in a predetermined cycle as lighting-period control, and saves the amount of light during a period of determination of the presence or absence of the original S (Step S118). The process control then goes back to Step S108, and repeats the subsequent processes until the original-presence determining unit 59 determines that the original S is absent on the transparent platen 22 at Step S110.

According to the FB scanner 1 of the embodiment of the present invention as described above, the amount of processing data can be reduced. Moreover, the presence or absence of the original S on the transparent platen 22 can be determined without any separately provided component, such as an additional sensor. Furthermore, for example, even if the FB scanner 1 is an FB image reading apparatus that does not include an original holder cover that is provided on the housing 2 in a movable manner to cover and uncover the transparent platen 22 and configured to cover the original S pposingly to the transparent platen 22 in the closed position, the presence or absence of the original S on the transparent platen 22 can be determined. As a result, the FB scanner 1 can determine the presence or absence of the original S on the transparent platen 22 with a simple configuration, thereby avoiding leaving behind the original S on the transparent platen 22 after reading an image with the simple configuration.

Moreover, the presence or absence of the original S on the transparent platen 22 can efficiently determined.

Furthermore, even if a size of the original S to be read by the FB scanner 1 or its position arranged on the transparent platen 22 is not constant, a determination position can be set at an appropriate position in accordance with the size and the position of the original S.

Moreover, the determination position can be set at a position where the original S is arranged at least when reading the primary image data, so that determination image data can be read appropriately for the original-presence determining unit 59 to determine the presence or absence of the original S.

Furthermore, the central-position detecting unit 57 can avoid setting a determination position at the end of the original S, so that the determination position can be set in the vicinity of the center of the original S where there is no black stripe pattern, such as a magnetic stripe. As a result, this can prevent a situation that an image of the original S is not distinguished from the background image and edges of the original S cannot be detected in the determination image data read by the optical reading unit 3 due to a black stripe-pattern area that is read together into the determination image data.

Moreover, the original-presence determining unit 59 compares primary image data at a determination position with determination image data, then if a determination image corresponding to the determination image data is substantially equal to a primary image at the determination position corresponding to the primary image data at the determination position, it can be determined that the original S is present on the transparent platen 22, by contrast, if the determination image data is different from the primary image data, it can be determined that the original S is absent on the transparent platen 22.

Furthermore, if a position of the original S based on determination image data is at the substantially same position as a position of the original S based on primary image data, the original-presence determining unit 59 can determine that a determination image corresponding to the determination image data and a primary image at the determination position corresponding to the primary image data are the substantially same images, consequently, can determine that the original S is still laid on the transparent platen 22 after the primary image data is read. By contrast, if the position of the original S based on the determination image data is at a position different from the position of the original S based on the primary image data, the original-presence determining unit 59 can determine that the determination image of the representation of the determination image data and the primary image at the determination position of the representation of the primary image data are different images, consequently, can determine that the original S is removed from the transparent platen 22 after the primary image data is read.

Moreover, the amount of light from the light source 31 during a period of determination of the presence or absence of the original S can be reduced. As a result, user discomfort caused by light emission from the light source 31 can be reduced during the period of determination.

Furthermore, an erroneous detection of the left-behind state of the original S on the original S can be avoided.

Moreover, the display device 6 and the alarm 8 can securely prevent the user from leaving behind the original S on the transparent platen 22 after primary image data is read.

The image reading apparatus described above according to the embodiment of the present invention is not limited to the embodiment, but also can be modified in various manners within a scope of the claims. Although it is explained above that the determination-position setting unit sets a determination position based on primary image data, the present invention is not limited to this. For example, if sizes of media to be read by the image reading apparatus are constant, the determination position can be fixedly set in advance.

Although it is explained above that the determination-position setting unit detects a central position in the sub-scanning direction of a medium on the medium arrangement surface based on edges of the medium detected by the medium-position detecting unit, and sets a determination position at the central position, the present invention is not limited to this. Alternatively, the determination position can be anywhere within a range in which information on the medium can be appropriately read on the medium arrangement surface.

Although it is explained above that the display device 6 and the alarm 8 give a notice that a medium is left behind based on a result of determination of the presence or absence of the medium obtained by the determining unit, the present invention is not limited to this. Alternatively, for example, a notice that a medium is left behind can be given by turning on and off a light source, such as a lamp in a color that can be easily recognized by a user, in a cycle to be easily recognized by the user.

Although it is explained above that the light-source control unit is configured to turn on and off the light source included in the image reading unit during a period of determination of the presence or absence of a medium performed by the determining unit, the present invention is not limited to this, but also the light source can be on continuously during the period of determination. In such case, reading of determination image data can be performed with light in a light region other than the visible region, such as infrared rays, so that user discomfort can be reduced.

Although it is explained above that the determining unit is configured to determine the presence or absence of a medium on the medium arrangement surface based on primary image data and determination image data at a determination position, the presence or absence of a medium on the medium arrangement surface can be determined based on a plurality of pieces of determination image data. In such case, for example, the light-source control unit 60 (see FIG. 1) increases and decreases the amount of light from the light source 31 of the optical reading unit 3 during a period of determination of the presence or absence of the original S as a medium performed by the original-presence determining unit 59 (see FIG. 1) as the determining unit. The original-presence determining unit 59 then determines the presence or absence of the original S on the transparent platen 22 based on the pieces of determination image data read at determination positions by the optical reading unit 3 along a time sequence. If the original S is present on the transparent platen 22, a determination image corresponding to determination image data read by the optical reading unit 3 when the amount of light from the light source 31 relatively increases (typically, while the light is on) differs from a determination image corresponding to determination image data read by the optical reading unit 3 when the amount of light relatively decreases (typically, while the light is off), because of a large difference in the amounts of received light that is irradiated from the light source 31, reflected by the original S, and then received by the line image sensor 32. Consequently, a strip pattern appears in an image of the pieces of determination image data formed by placing in line the pieces of determination image data read at the determination positions along the time sequence. For this reason, the original-presence determining unit 59 can determine that the original S is present on the transparent platen 22 when a stripe pattern appears in an integrated image corresponding to integrated determination image data made by time-sequentially combining the pieces of the determination image data read along the time sequence.

By contrast, if the original S is absent on the transparent platen 22, a determination image of determination image data read by the optical reading unit 3 when the amount of light from the light source 31 relatively increases is similar to a determination image of determination image data read when the amount of light relatively decreases, because of little difference in the amounts of light received by the line image sensor 32. Consequently, stripe pattern does not appear in an image of the pieces of the determination image data formed by placing in line the pieces of determination image data read at the determination positions along the time sequence. For this reason, the original-presence determining unit 59 can determine that the original S is absent on the transparent platen 22 when stripe pattern does not appear in an integrated image corresponding to integrated determination image data made by time-sequentially combining the pieces of the determination image data read along the time sequence. Thus, the determining unit determines the presence or absence of a medium on the medium arrangement surface based on a plurality of pieces of determination image data, thereby further reducing the amount of processing data, for example, compared with the case where the presence or absence of a medium on the medium arrangement surface is determined based on primary image data and determination image data.

Although it is explained above that the image reading apparatus does not include an original holder cover that is provided on the housing 2 in a movable manner to cover and uncover the transparent platen 22 and configured to cover the original S opposingly to the transparent platen 22 in the closed position, the image reading apparatus can include the original holder cover. In such case, the original holder cover is configured to be placed close to the transparent platen 22 in the closed state to bring the original S into contact with the transparent platen 22, so that the original holder cover can prevent a gap that is otherwise produced between the original S and the transparent platen 22 during reading operation caused by a fold or a flexion of the original S.

With the image reading apparatus according to the embodiments of the present invention, the presence or absence of a medium on the medium arrangement surface is determined based on determination image data that is different from primary image data, and read by the image reading unit at a determination position arranged between the home position and a reading-end position of the primary image data, so that the presence or absence of a medium on the medium arrangement surface can be determined with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    an image reading unit, movable from a home position to a reading-end position in a sub-scanning direction along a medium arrangement surface on which a medium is arranged, for reading primary image data from the medium, and reading determination image data after reading the primary image data at a determination position set between the home position and the reading-end position, the determination image data having a smaller amount of data than that of the primary image data, and having substantially equal image data to that of the primary image data at the determination position when the medium is present; and
    a determining unit for determining the presence or absence of the medium on the medium arrangement surface based on both the primary image data at the determination position and the determination image data at the determination position, and based on a difference between the determination image data at the determination position and the primary image data previously read at the determination position.

2. The image reading apparatus according to claim 1, further comprising:
    a carrying unit that moves the image reading unit in the sub-scanning direction; and
    a drive control unit that controls driving of the carrying unit, wherein
        the drive control unit moves the image reading unit from the reading-end position to the determination position with the carrying unit after reading of the primary image data is finished and stops the image reading unit at the determination position, and then moves the image reading unit from the determination position to the home position with the carrying unit after the determining unit determines that the medium is absent on the medium arrangement surface and stops the image reading unit at the home position, and the image reading unit reads the determination image data along a scanning direction perpendicular to the sub-scanning direction when stopping at the determination position.

3. The image reading apparatus according to claim 1, further comprising a determination-position setting unit that sets the determination position based on the primary image data.

4. The image reading apparatus according to claim 3, further comprising a medium-position detecting unit that detects a position of the medium on the medium arrangement surface based on the primary image data, wherein the determination-position setting unit sets the determination position based on the position of the medium detected by the medium-position detecting unit.

5. The image reading apparatus according to claim 4, wherein
the medium-position detecting unit detects the position of the medium by detecting edges extending along the sub-scanning direction of the medium on the medium arrangement surface based on the primary image data, and
the determination-position setting unit detects a central position of the medium on the medium arrangement surface in the sub-scanning direction based on the edges detected by the medium-position detecting unit, and sets the determination position at the central position.

6. The image reading apparatus according to claim 1, wherein the determining unit determines that the medium is present on the medium arrangement surface when a deviation of a position of the medium on the medium arrangement surface based on the primary image data at the determination position from a position of the medium on the medium arrangement surface based on the determination image data is within a predetermined range, and determines that the medium is absent on the medium arrangement surface when the deviation in the positions of the medium exceeds the predetermined range.

7. The image reading apparatus according to claim 1, further comprising a light-source control unit that controls activation of a light source included in the image reading unit, wherein the light-source control unit turns on and off the light source during a period of determination of the presence or absence of the medium performed by the determining unit.

8. The image reading apparatus according to claim 1, further comprising a light-source control unit that controls activation of a light source included in the image reading unit, wherein
the light-source control unit turns on and off the light source during a period of determination of the presence or absence of the medium performed by the determining unit, and the determining unit determines the presence or absence of the medium based on a plurality of pieces of the determination image data.

9. The image reading apparatus according to claim 1, wherein the determining unit detects a left-behind state of the medium on the medium arrangement surface when a period during which it is determined that the medium is present on the medium arrangement surface continues for a predetermined period.

10. The image reading apparatus according to claim 1, further comprising a notifying unit that gives a notice that the medium is left behind based on a result of determination of the presence or absence of the medium obtained by the determining unit.

11. An image reading apparatus comprising:
an image reading unit, movable from a home position to a reading-end position in a sub-scanning direction along a medium arrangement surface on which a medium is arranged, for reading primary image data from the medium, and reading determination image data after reading the primary image data at a determination position set between the home position and the reading-end position, the determination image data being different from the primary image data;
a determining unit for determining the presence or absence of the medium on the medium arrangement surface based on the determination image data; and
a determination-position setting unit that sets the determination position based on the primary image data.

12. The image reading apparatus according to claim 11, further comprising a medium-position detecting unit that detects a position of the medium on the medium arrangement surface based on the primary image data, wherein the determination-position setting unit sets the determination position based on the position of the medium detected by the medium-position detecting unit.

13. The image reading apparatus according to claim 12, wherein
the medium-position detecting unit detects the position of the medium by detecting edges extending along the sub-scanning direction of the medium on the medium arrangement surface based on the primary image data, and
the determination-position setting unit detects a central position of the medium on the medium arrangement surface in the sub-scanning direction based on the edges detected by the medium-position detecting unit, and sets the determination position at the central position.

* * * * *